2,984,992

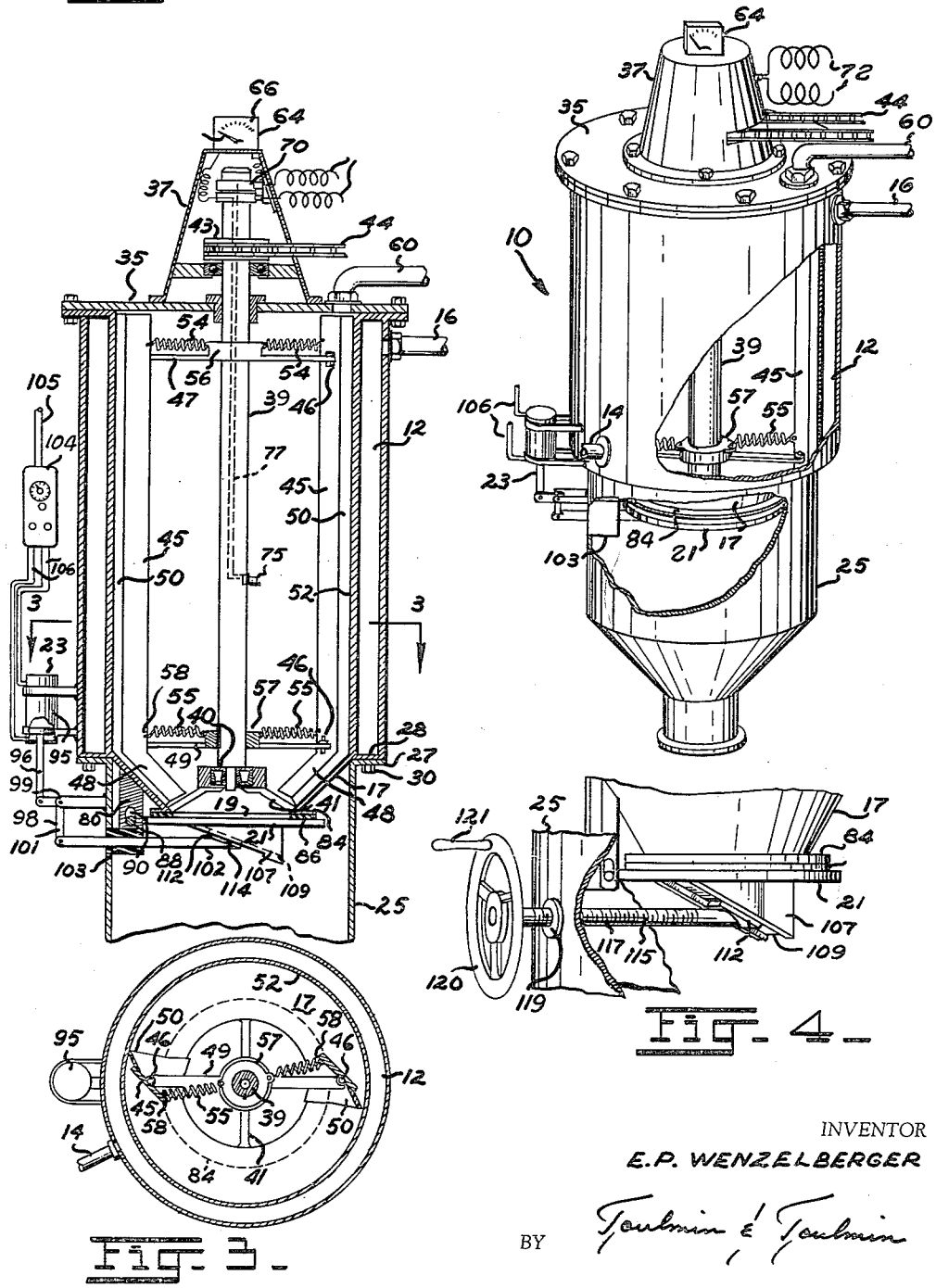
May 23, 1961    E. P. WENZELBERGER    2,984,992
APPARATUS FOR FREEZE DEHYDRATION OF LIQUID BEARING SOLIDS
Filed July 28, 1954
INVENTOR
E. P. WENZELBERGER
BY Toulmin & Toulmin
ATTORNEYS United States Patent Office 2,984,992
Patented May 23, 1961

APPARATUS FOR FREEZE DEHYDRATION OF LIQUID BEARING SOLIDS

Elwood P. Wenzelberger, Dayton, Ohio, assignor, by mesne assignments, to Union Carbide Corporation, New York, N. Y., a corporation of New York Filed July 28, 1954, Ser. No. 446,310

2 Claims. (Cl. 62—123)

This invention relates to an apparatus and method for use in freeze dehydration of heat-sensitive liquid bearing solids.

It is a particular object of the invention to provide an improved freeze dehydrating apparatus and method for removing water from water bearing substances such as vegetable juices, fruit juices, beer, wines, milk, coffee, heat sensitive resins, pharmaceuticals, antibiotics, and the like wherein it is desired to remove the solvent, particularly water.

It is another object of the invention to provide an improved apparatus and method wherein vegetable juice, particularly citrus juices, are subjected to progressive freezing temperature wherein the water is removed by subjecting the juice to successive and progressively lower temperatures which result in the formation of fine crystals of ice, which is removed to produce a final dehydrated juice.

It is another object of the invention to provide an improved apparatus and system of freeze dehydrating substances so as to eliminate the tendency for ice to cling or form on the interior of the tank or freezing equipment parts, which has been a problem heretofore.

Another object is to provide an improved apparatus and method of freeze dehydration which overcomes the difficulty wherein scraper blades are employed which tend to bend and collide in operation due to the formation of ice about the blades, and which build up an insulating layer against the cold wall of the freezing tank which results in lowering the efficiency of the freeze dehydration system and sometimes causes shut downs.

Another object of the invention is to provide a freezing tank which is of simplified construction and operation, and wherein the internal moving parts are substantially dispensed with and a simpler and more positive operation of the freezing tank provided.

These and further objects and advantages will become apparent from the following description taken in connection with the drawing wherein:

Figure 1 is an elevational view in perspective of a freezing tank constructed and operated in accordance with this invention, a portion of the tank being broken away and shown in section to illustrate the interior blade structure;

Figure 2 is a vertical sectional view taken through the tank shown in Figure 1;

Figure 3 is a sectional view taken through the tank and substantially on the line 3—3 of Figure 2, looking in the direction of the arrows, the mechanism for actuating the hinged trap door for opening and closing the bottom of the tank being shown in elevation;

Figure 4 is a fragmentary detailed view in perspective and partly in section, and illustrates a manual operable means for actuating the trap door as provided for opening and closing the bottom of the tank.

Referring to the drawing more in detail, reference character 10 designates a freezing tank embodying the improved features of this invention. The tank illustrated constitutes one of a series of tanks, of like construction and operation for carrying out freeze dehydration in a plurality of stages. The system comprises preferably five tanks interconnected so that the initial freezing stage or cycle is carried out in the No. 1 tank, stage two freezing in the No. 2 tank, etc., as described in U.S. Patents 2,559,204 and 2,559,205. The construction and operation of the tanks are the same for each stage, the freezing temperature being progressively lowered as the juice progresses through the stages.

The freezing tanks 10, as illustrated in the drawing, are dimensioned so that they are greater in height than their diameters, being provided with a jacket 12 on the outside for receiving refrigerant which is circulated therethrough. The refrigerant material is conducted thereto through a pipe 14 and therefrom through pipe 16. The tank is provided with a conical-shaped bottom 17 terminating in an opening 19 which is controlled by the swinging trap door 21, the door being adapted to be actuated either manually or by automatic means, such as an air piston mechanism 23, shown in Figure 2, or manually by a handwheel operated means as illustrated in Figure 4.

The tank, as illustrated in Figures 1 and 2, is provided with a cylindrical duct or canopy 25 enclosing the trap door 21 and associated discharge mechanism at the bottom of the tank. The duct is provided with an annular flange 27 at its upper end which is fitted to the annular flange portion 28 on the bottom of the tank, the duct being secured thereto by a bolt 30, as shown in Figure 2.

Preferably the tank is formed of stainless steel or lined therewith and is provided with a cover member 35. This cover carries a drive assembly 37 which is centrally supported on the cover. A central shaft 39 extends vertically through the cover 35 and centrally of the tank, the shaft being supported for rotation in a thrust bearing 40 located at the bottom of the tank and carried by the spider frame 41 which is supported on the lower end of the conical tank portion 17. The shaft 39 is suitably rotated by means of a sprocket 43 which is keyed to the shaft and arranged to be driven by the chain 44, the latter being suitably driven by a motor or prime mover means, not shown.

Attached to the shaft 39 are a pair of vertically disposed scraper blades 45, which blades are pivotally secured as at 46 on the outer ends of the arms 47, the arms being carried by the shaft 39. The blades 45 are provided with lower sweep blade portions 48, which form an integral extension of blades 45. If desired, however, these blade portions may comprise separate blades which are suitably carried by the arms 49 in the lower part of the tank and to which blades 45 are secured. The blades 48 are arranged to sweep the inner wall of the tank portion 17 similarly as the blades 45 sweep the vertical side walls of the tank. This prevents the formation of ice or a heat-insulating cold layer of material on the wall surfaces of the tank which would lower the efficiency of the refrigerating tank.

The scraper blades 45 and 48 are equipped with outer contact blade portions 50. These contact blade portions are preferably fabricated of nylon and arranged to provide a sweeping contact with the inner walls 52 of the tank as the shaft 39 rotates. Coil spring means 54 and 55 are suitably attached to the ring members 56 and 57 respectively and to the inner ends of the blades 45, as at 58. These coil springs provide a low tension on the blades 45 so as to lightly press the nylon blade members 50 against the side walls of the tank as the same revolve upon rotation of the shaft 39.

The material to be dehydrated, such as citrus juices, is admitted to the interior of the tank through a conduit 60. Means is provided for controlling the temperature of the interior of the tank as by utilizing a heat controller mechanism 64 and suitably arranged at the top of the driving mechanism 37. This heat controller comprises a dial means 68 which is arranged to move over the dial 66. Electrical connection is made to the heat controller through a collector ring and brush mechanism 70 which is electrically connected through the line 72 to an electrical source for controlling the temperature of the refrigerant. A thermometer bulb 75 is arranged for positioning in the central interior of the tank, as shown in Figure 2, the same being electrically connected to a central conduit means 77 which connects the thermometer 75 with the heat controller 64.

The trap door 21 is swingable mounted on a bracket 80 which is carried by the conical shaped wall portion 17 of the tank, and which portion terminates in an annular flange member 84. The trap door 21 is provided with an annular gasket means 86 which is arranged to fit snugly against the flange 84 when the door is in its closed position. The trap door 21 is suitably hinged as at 88, the pivot means 88 being arranged to move longitudinally in a vertical slot 90 of the bracket 80. This provides self-adjustment of the trap door so that it can fit snugly against the annular flange 84 and prevent any leakage about the flange upon swinging the door to its closed position.

Mechanism for automatically actuating the opening and closing of the trap door 21 is illustrated diagrammatically in Figure 2. This mechanism consists of an air piston 95 which piston operates the rod 96 to swing the bellcrank lever 98 about its pivot 99. Pivotally attached to the end of an arm 101 of the bellcrank 98 is a connecting rod 102 which is arranged to be reciprocated back and forth to open and close the trap door 21. The rod 102 is suitably guided through the side wall of the duct 25 by a yieldable guide sleeve 103 which permits angular movement of the rod as required. An electrical timer 104 is utilized for bringing about actuation of the air piston cylinder 95. The timer may be set to operate at the end of a twenty minute freezing cycle to cause air pressure in line 105, which is in communication with an air compressor, not shown, to admit air through the appropriate line 106 to operate the piston cylinder 95.

Secured to the underside of the trap door 21 is a triangular-shaped member 107 which is provided with a guide track or groove 109 and having a shoe 112 arranged to slide in the groove or trackway 109. Rod 102 is pivotally secured at its inner end to the shoe 112, as shown at 114. As will be seen, the movement of the rod to the right causes the shoe 112 to ride upwardly on the triangular-shaped member 107 and swing the trap door closed against the annular gasket 86. Likewise, shifting of the rod 102 to the left allows the trap door to swing downwardly and away from the tank and open the same for discharge of the material. This provides for quick opening and closing of the tank.

When the trap door is desired to be operated manually there may be substituted for the rod 102 a threaded actuating rod 115, as shown in Figure 4. The rod 115 is suitably threaded at 117, the same passing through the threaded union 119 arranged in the side wall of the duct 25, as shown in Figure 4. For turning the rod 115 so as to thread it inwardly and against the triangular-shaped member 107 and to move the shoe 112 along the groove or trackway 109 a hand wheel 120 is provided which may be grasped and turned by the handle arm 121.

In the operation of the freezing tank the material such as juice to be freeze dehydrated is admitted to the interior of the tank through the conduit 60 and the shaft 39 operated to revolve the scrapers and refrigerant admitted to the jacket 12 to cause freezing of the water out of the juice as small ice crystals. After the freezing cycle has been completed, the trap door 21 is opened and the frozen slushy mass discharged to a centrifuge, and the ice separated therefrom. The mother liquor is then returned to the next tank for the next freezing cycle and so on through the five tanks, each tank being constructed and operated as tank 10.

By utilizing the simplified apparatus of this invention, it has been found that when utilizing stainless steel the metal wall conducts or transfers the heat from the juice or other material being dehydrated in the time allotted for each cycle.

The conductivity heat factor for the tank structure shown was calculated in accordance with Fourier's equation of heat conductivity and applying the K value, so obtained, to a time rate and unit area of the stainless steel metal of ⅛-inch thickness. The working time cycle as calculated was found to conform with a twenty minute time cycle of freezing for each stage of the process. Utilizing a ⅛-inch thick stainless steel sheet it was found that one square foot area has the capacity to conduct 504 B.t.u.'s in one minute. Thus, by providing a ratio of a square foot of cold surface to gallons of the product being treated, of approximately 1.0–1.6 for each tank, the required amount of freezing for each stage during a fifteen to twenty minute cycle was found sufficient and so that at the temperature differential employed between the stages to form the fine particles of ice crystals which can be readily separated from the mother liquor. The temperature differential between the freezing cycles were also found to conform to approximately 7° F. temperature differential.

The freezing conditions and procedure for carrying out a five stage operation with a 12% solids orange juice and a 10% solids orange juice are set out below—

*12% solids—orange juice*

Initial ice forming point, 28° F.:

1 tank—juice at 23° F., refrigerant 16° F.
2 tank—juice at 16° F., refrigerant 9° F.
3 tank—juice at 9° F., refrigerant 2° F.
4 tank—juice at 2° F., refrigerant −5° F.
5 tank—juice at −5° F., refrigerant −12° F.

*10% solids—orange juice*

Initial ice forming point, 32° F.:

1 tank—juice at 27° F., refrigerant 20° F.
2 tank—juice at 20° F., refrigerant 13° F.
3 tank—juice at 13° F., refrigerant 6° F.
4 tank—juice at 6° F., refrigerant −1° F.
5 tank—juice at −1° F., refrigerant −8° F.

Different liquids, of course, have different initial congealing points so that a temperature scale is established for each material process. Furthermore, the temperature differential of 7° F. may be modified to between 5–8° F. Various temperatures at which ice crystals may form may be used in each or all of the tanks.

Typical operation of the wiper blades may be brought about by rotating the shaft 39 carrying the blades at a speed of approximately 125 r.p.m. This speed may be varied according to the size of the tank and the material being processed.

Suitable mechanism for removing the ice is employed, such as a centrifuge or vibrating screen, the same being used as a common separator for the plurality of tanks. A small portion of the ice particles is returned to the next tank to provide the desired seeding of the mother liquor and thus speed up the formation of the ice crystals in the next freezing stage of the process. A counter flow of ice crystals may be used, if desired, for advantageously cooling the incoming fresh juice or material being subjected to freeze dehydration. Such a system for circulating and utilizing the various tanks in carrying out step-freeze dehydration is more particularly described in my U.S. Patent 2,657,555 to which reference may be made for further particulars, the present invention being more especially directed to a new and improved freezing tank and its operation in such a freeze dehydration system.

The amount of heat per square foot conducted away from the material being freeze dehydrated in the tanks becomes proportionately less as the product concentrate increases and the volume of the product becomes less. This represents an increase in efficiency because the unit area and the time factor remain constant. This increase of efficiency as provided by the freezing tank of this invention is advantageous because as the concentrate increases the viscosity increases and this tends to slow down the heat convection and conduction of the liquid to the walls of the freeze tank. The mobility of the fluid becomes less as the viscosity increases, thus it takes a longer time to make the interface change at the surface of the cold wall of the tank, thereby slowing down the heat extraction rate. To overcome this, at least as far as commercially practical, the conductivity efficiency must be maintained at a maximum in order to keep the freezing cycle time constant.

In the present system utilizing the improved freeze tank structure for a twenty minute freezing cycle at 7° F. temperature differential as set forth above and starting with 100 gallons of orange juice, the following table indicates the B.t.u. transfer rate utilizing the improved freezing tank apparatus of the present invention.

TABLE I

| Stage | Sq. Ft. of Cold Tank Surface Total | Total B.t.u. to Extract | B.t.u. per Minute to Extract | Total B.t.u. per sq. ft. to Extract | B.t.u. per Minute per 1 sq. ft. to Extract |
|---|---|---|---|---|---|
| 1 | 25 | 42,172 | 2,108 | 1,700 | 84 |
| 2 | 20 | 27,943 | 1,400 | 1,400 | 70 |
| 3 | 16 | 18,396 | 920 | 1,150 | 58 |
| 4 | 13 | 13,604 | 630 | 970 | 50 |
| 5 | 10 | 8,417 | 421 | 842 | 42 |

K value for ⅛-inch thick stainless steel sheet conductivity=504 B.t.u./1 min./sq. ft.

By referring to the last column of Table I it will be noted that the heat transfer values for the system are well within the limits of 504 B.t.u. for stainless steel which indicates that under normal operating conditions the system will function properly employing a twenty minute time cycle for each of the five freezing stages.

It will also be noted by referring to the table that in stage No. 1 with 84 B.t.u.'s per minute per square foot the material will freeze in the same approximate time that the No. 5 stage freezes containing only 42 B.t.u.'s per minute per square foot to be transferred, providing that the capacity of the metal separating wall can easily conduct both these amounts of heat. In the present system utilizing a wall capacity of 504 B.t.u.'s maximum per minute per square foot this can be readily accomplished.

The scraper blades in the tanks provide positive and efficient operation and as constructed and operated maintain optimum conditions of interface change. The blades are operated so that ice films or particles are not allowed to form on the inner walls of the tank or on any part of the cold surfaces. When this occurs the efficiency of the freezing tank is substantially lowered because of the insulation factor which is introduced by the building up of a film of ice on any of the surfaces of the equipment.

By eliminating cylinders or cooling devices arranged inside the freezing tank the interior of the tank is practically clear except for the vertical spindle and pair of self-adjusting spring loaded scraper blades. The scraper blades are provided with outer blade contact members which are preferably made of nylon or other suitable synthetic tough resinous material or the like, and which blades are arranged to lightly contact the inner walls of the tank. For this purpose the blades are suitably hinged and placed under light spring tension, for example approximately 30 lbs. so that the blade will follow and scrape the inside surface of the tank even though this surface is slightly irregular or slightly out of round. In the discharge operation the sweep blades are attached to the bottom cross arm to clear the comb surface of ice.

The scraper carrying shaft 39 is preferably rotated slowly. The speed and foot per minute travelled may be varied depending upon the diameter of the tank and may be determined for best results by trial.

It is an essential feature of this invention and operation of the freezing tank to actuate the blades at a speed that will not permit ice to form on any part of the cold wall.

The rotating central shaft 39 carrying the scraper blades is fitted with a thermometer bulb which leads to a thermostat which controls the temperature and discharge time. The thermostat is arranged in the heat controller located on top of the tank as described.

Where the amount of water present in the product to be freeze dehydrated is relatively high such as a fruit juice which has been concentrated to about 12%, it has been found that it is easier to freeze the water out than in the case where the juice has been concentrated by the removal of water, for example to a 40% concentrated juice. This is apparently due to the fact that where freezing water only, which freezes normally at 32° F., and although the freezing point of the product is a function of the amount of dissolved substance in the water, it is essential that the water freeze out as crystals of pure water ice. This is further assisted by the introduction of a few pure water ice crystals to promote the freezing and act as seeds to accelerate the formation of more ice crystals of pure water by forming them of the solution which is supercooled as far as the water alone is concerned, even though the actual temperature is equal to that of the freezing point of the solution contained therein.

This apparently explains why the more dilute stage cycles of freezing permit operation at a more rapid rate than when freezing a more concentrated juice as in the later stages. This condition is also augmented by the relative mobility of the product at low and high concentration. The more mobile or less viscous the liquid the greater amount of heat convection as well as conduction is provided thus transmitting this heat to the cold wall more rapidly than in the case of a more viscous liquid.

Utilizing the freezing tanks of this invention in the freeze dehydrating system as described, the concentrated dehydrated product may be delivered to containers for packaging for distribution either in the frozen or unfrozen state as desired. The dehydrated product such as citrus juice or the like may be further processed in order to reduce it to a dry product as desired for certain particular purposes.

The advantages obtained by the improved process and apparatus of this invention makes it possible to produce a dehydrated product wherein the flavor and aroma of the concentrate is maintained and it is only necessary to add water which has been removed by the freeze dehydration to produce a product having like physical and chemical characteristics as the original untreated product. Due to the fact that the water is removed substantially by freezing, the vitamins, flavor and aroma of the original product are not changed or removed.

It will be understood that the apparatus and method may be changed to suit different conditions and uses, and procedures and temperatures in the freeze dehydration system may be varied somewhat to suit the different materials being treated. These changes as required are understood to be comprehended as a part of this invention, and which are more particularly set forth in the appended claims.

What is claimed is:

1. An improved apparatus for the freeze dehydration of liquid bearing solids by the freezing out of water as ice crystals and whereby the tendency for ice crystals to cling to the interior walls of the refrigerating tank is substantially eliminated, said apparatus comprising a tank for holding said liquid bearing solids to be refrigerated, said tank comprising an outer shell forming a chamber for receiving refrigerant, means comprising a plurality of vertically disposed radially spaced stirring blade means arranged in said tank for stirring the liquid bearing solids being dehydrated, yieldable outer blade portions of nylon on said blades and arranged to provide a sweeping contact engagement of said portions with the inner side and bottom walls of said tank, means for driving said blades comprising a vertically disposed driven shaft having radially extending arm members on said shaft with said blade means mounted on the outer ends of said arms, means for rotating said shaft and attached blades, yieldable means connected with said blades and operable for providing a low tension on said blades and cause said outer blade portions to press lightly against the side and bottom walls of said tank upon rotation of said shaft, a discharge opening at the bottom of said tank, said tank comprising a lower conical shaped wall portion terminating in said discharge opening, an annular flange on the lower end of said conical shaped wall portion, a gasket mounted on said flange, a closure means comprising a quick opening hinged trap door for said discharge opening which is swingable to and from said annular flange and gasket and fit snugly thereagainst when said door is in its closed position, piston actuated means for quickly moving said closure member to and from said discharge opening to open and close said tank, and means including an electrical timer and coacting electrically operated mechanism for automatically actuating said quick opening closure means at the end of a predetermined freezing time cycle.

2. An improved apparatus for the freeze dehydration of liquid bearing solids by the freezing out of water as ice crystals whereby the tendency for ice crystals to cling to the interior walls of the refrigerating tank is substantially eliminated, said apparatus comprising a tank for holding said liquid bearing solids to be refrigerated, said tank comprising an outer shell forming a chamber for receiving refrigerant, means comprising a plurality of vertically disposed radially spaced stirring blade means arranged in said tank for stirring the liquid bearing solids being dehydrated, yieldable outer blade portions consisting of nylon disposed on said blades and arranged to provide a sweeping contact engagement of said portions with the inner side and bottom walls of said tank, means for driving said blades comprising a vertically disposed driven shaft having radially extending arm members on said shaft with said blade means mounted on the outer ends of said arms, means for rotating said shaft and attached blades, spring means operatively connected to said blades and adapted to produce a low tension on said blades so as to cause said outer blade portions to press lightly against the side and bottom walls of said tank upon rotation of said shaft, a discharge opening at the bottom of said tank, a closure means comprising a quick opening swingable trap door for said discharge opening, means for quickly moving said closure member to and from said discharge opening to open and close said tank, and means including an electrical timer and coacting electrically operated mechanism for automatically actuating said quick opening closure means at the end of a predetermined freezing time cycle.

References Cited in the file of this patent

UNITED STATES PATENTS

| | | |
|---|---|---|
| 1,738,275 | Baker | Dec. 3, 1929 |
| 2,354,633 | Bedford | July 25, 1944 |
| 2,436,218 | Malcolm | Feb. 17, 1948 |
| 2,563,093 | Bayston | Aug. 7, 1951 |
| 2,575,374 | Walsh | Nov. 20, 1951 |
| 2,676,469 | Wenzelberger | Apr. 27, 1954 |